United States Patent [19]

Neuroth

[11] E Patent Number: Re. 32,225

[45] Reissued Date of Patent: Aug. 12, 1986

[54] OIL WELL CABLE

[75] Inventor: David H. Neuroth, Bethany, Conn.

[73] Assignee: Harvey Hubbell Incorporated, Orange, Conn.

[21] Appl. No.: 613,085

[22] Filed: May 22, 1984

Related U.S. Patent Documents

Reissue of:

[64] Patent No.: 4,409,431
Issued: Oct. 11, 1983
Appl. No.: 291,125
Filed: Aug. 7, 1981

[51] Int. Cl.[4] ..... H01B 7/18

[52] U.S. Cl. ..... 174/103; 174/109; 174/117 F

[58] Field of Search ..... 174/102 SP, 103, 104, 174/105 R, 105 B, 109, 113 R, 116, 117 R, 117 F, 131 R, 131 A, 131 B

[56] References Cited

U.S. PATENT DOCUMENTS

| | | | |
|---|---|---|---|
| 243,290 | 6/1881 | Mowbray | 174/104 |
| 292,772 | 1/1884 | Hoevenbergh | 174/113 R |
| 1,008,370 | 11/1911 | Robillot | 174/113 R |
| 1,927,845 | 9/1933 | Pheazey | 173/266 |
| 2,165,738 | 7/1939 | Hoffen | 174/105 R |
| 2,544,233 | 3/1951 | Kennedy | 174/117 R |
| 2,897,253 | 7/1959 | Daney et al. | 174/109 |
| 3,351,706 | 11/1967 | Gnerre et al. | 174/105 R |
| 4,187,391 | 2/1980 | Voser | 174/109 X |
| 4,257,675 | 3/1981 | Nakagome et al. | 350/96.23 |
| 4,277,642 | 7/1981 | Piper | 174/117 R |
| 4,282,398 | 8/1981 | Solomon | 174/109 X |

FOREIGN PATENT DOCUMENTS

| | | | |
|---|---|---|---|
| 0060061 | 9/1982 | European Pat. Off. . | |
| 753705 | 12/1951 | Fed. Rep. of Germany | 174/113 R |
| 1020074 | 11/1957 | Fed. Rep. of Germany | 174/117 |
| 2532534 | 1/1977 | Fed. Rep. of Germany . | |
| 437525 | 5/1935 | United Kingdom . | |
| 699558 | 11/1953 | United Kingdom . | |
| 1242494 | 8/1971 | United Kingdom . | |
| 1250823 | 10/1971 | United Kingdom | 174/136 |
| 1387180 | 3/1975 | United Kingdom . | |
| 1387991 | 3/1975 | United Kingdom | 174/102 SP |
| 1418554 | 12/1975 | United Kingdom . | |
| 2069746 | 8/1981 | United Kingdom . | |

*Primary Examiner*—A. T. Grimley
*Assistant Examiner*—Morris H. Nimmo
*Attorney, Agent, or Firm*—Jerry M. Presson; Alfred N. Goodman

[57] ABSTRACT

A cable structure includes a plurality of insulated conductors, an exterior jacket and at least one support member within the jacket and between the insulated conductors. Each support member is made of a material which has good thermal conductivity and which is rigid to resist crushing of the cable and damage to the conductors or their insulation. Variously shaped support members are disclosed.

40 Claims, 9 Drawing Figures

OIL WELL CABLE

Matter enclosed in heavy brackets [ ] appears in the original patent but forms no part of this reissue specification; matter printed in italics indicates the additions made by reissue.

This invention relates to an electrical cable intended particularly for use in an adverse environment such as that encountered in an oil well.

BACKGROUND OF THE INVENTION

Electrical cables which are used in oil wells must be able to survive and perform satisfactorily under conditions of heat and mechanical duress which can be extreme. Ambient temperatures in wells are often high and the $I^2R$ losses in the cable itself add to the existing heat. The service life of a cable is known to be inversely related to the temperature at which it operates. Thus, it is important to be able to remove heat from the cable while it is in its operating environment.

Cables are subjected to mechanical stresses in several ways. It is common practice to attach cables to oil pump pipes to be lowered into a well using bands which can, and do, crush the cables, seriously degrading the effectiveness of the cable insulation and strength. The cables are also subjected to axial tension and lateral impact during use.

It is therefore conventional to provide such cables with external metal armor and to enclose the individual conductors within layers of materials chosen to enhance the insulation and strength characteristics of the cable, but such measures are not adequate to provide the necessary protection.

An additional problem arises as a result of down-hole pressures, which can be in the hundreds or thousands of pounds per square inch, to which the cables are subjected. It appears that the insulation surrounding the conductors in a cable unavoidably has small pores into which gas is forced at these high pressures over a period of time. Then, when the cable is rather quickly extracted from the well, there is not sufficient time for decompression to occur, i.e., for the intrapore pressure to bleed off. As a result, the insulation tends to expand like a balloon and can rupture, rendering the cable useless thereafter.

Examples of prior art cables for various uses are found in the following U.S. Pat. Nos:

1,740,076—Delon
2,107,031—Evans
2,483,301—Roberds
2,810,010—Davey
3,102,740—Plummer
3,106,600—Crosby
3,409,731—Fink et al.
3,621,108—Cleaveland
3,681,509—Johnston et al.
3,798,346—Kreuzer
3,843,568—Woodland et al.
4,105,860—Ball
4,166,920—Friedrich et al.

BRIEF DESCRIPTION OF THE INVENTION

An object of the present invention is to provide a cable structure particularly for use in adverse environmental conditions which has effective means for transferring heat radially and along the cable and for protecting the cable against crushing.

A further object is to provide an elongated support member shaped to engage insulated conductors in a cable, the member being made of a material having good thermal conduction properties.

Yet another object is to provide such a support member which extends across the interior of a conductor jacket from one side to the other, the member being rigid so that forces tending to crush the cable are prevented from doing so by the member.

Another object is to provide such a cable having an external braid of metal strands surrounding the exterior jacket to protect the jacket from abrasion and to cooperate with the internal support members to remove and disperse heat. A still further object is to provide a cable having a support member which inhibits ballooning of the insulation resulting from large interior-exterior pressure differentials.

Briefly described, the invention includes an improved electrical cable comprising a plurality of elongated, insulated electrical conductors in substantially parallel relationship, an exterior jacket surrounding said conductors to form a cable and at least one elongated support member within said jacket and between and parallel with adjacent ones of said conductors, said at least one support member being shaped to conform to the exterior shapes of said adjacent ones of said conductors and extending across the interior of said jacket from one side thereof to the other, said support member being made of a rigid material having good heat conducting properties.

In order that the manner in which the foregoing and other objects are attained in accordance with the invention can be understood in detail, particularly advantageous embodiments thereof will be described with reference to the accompanying drawings, which form a part of this specification, and wherein.

Figure 1:
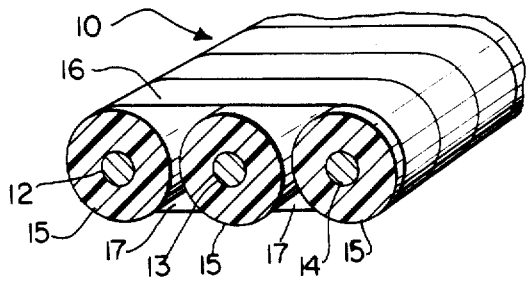
PRIOR ART FIG. 1
FIG. 1 is a partial perspective view, in section, of a prior art cable.

FIG. 1 illustrates, rather schematically, a portion of a prior art cable structure which is a cable of the type commonly referred to as "flat cable". Only a short segment indicated generally at 10 of the cable is shown and includes three insulated conductors having electrically conductive wires 12, 13 and 14 each surrounded by insulation 15. The three insulated conductors are contained within an exterior jacket 16 which holds the insulated conductors together and protects them.

As will be recognized, the insulation 15 can involve somewhat more than simply a covering of electrically non-conductive material. Normally, in an environment such as an oil well, a pump cable would include insulation which is a system of layers of insulated materials of different types to provide not only electrical insulation but to protect the conductor against adverse ambient conditions such as moisture and the like. However, this insulation system is, in itself, not part of the present invention and is conventional. Accordingly, it will not be further described herein.

Similarly, the exterior jacket 16 would normally consist of an interlock armor, and the jacket 16 or the coverings of the individual conductors can also include tapes and braids. Again, these are conventional cable construction features and need not be described in detail herein. Furthermore, the use of various kinds of insulation and jacket components can be expected to differ from one cable to another, depending upon the signal and power levels expected to be handled by the cables and the specific environments to which they will be subjected.

Of particular significance in FIG. 1 is the fact that the intervening regions between the cables, indicated at 17, are quite often air voids, although fillers of relatively soft material or rubber-like jacket materials are used between the cables. Again, there is considerable variation in this aspect of the cable structure, and examples of materials can be found in the previously mentioned prior art.

Figure 2:
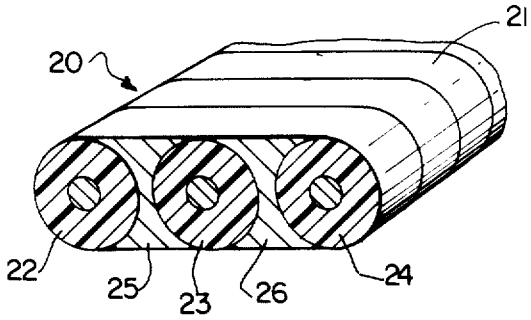
FIG. 2 is a partial perspective sectional view of a cable in accordance with one embodiment of the invention.

FIG. 2 illustrates a first embodiment of a cable structure in accordance with the present invention. The cable 20 illustrated therein includes an exterior jacket 21 which surrounds and encloses insulated conductors 22, 23 and 24 which are arranged, in this embodiment, so that the central axes of the conductors lie in essentially the same plane. The conductors are substantially parallel with each other and are of considerable length, as needed, only a short portion of the cable being illustrated in FIG. 2. Interposed between the insulated conductors are support for force-resisting members 25 and 26, each of the support members being elongated and extending parallel with the conductors. Support members 25 and 26 are made of a material which is substantially rigid and which is selected to have good thermal conductivity properties, i.e., thermal conductivity which is at least greater than the thermal conductivity of the conductor insulation. Fiber-filled carbon compositions are suitable for this purpose, and and also exhibit good compression resistance. Metals such as steel or aluminum are also suitable for this purpose, as are metal-filled curable polymeric materials.

As will be described in greater detail hereinafter, each of support members 25 and 26 has upper and lower surfaces which are substantially flat so that they conform to the upper and lower flat surfaces of jacket 21, and the lateral sides of the support members are arcuately curved to conform to the exterior shapes of the adjacent ones of the insulated conductors. As will be seen, crushing forces applied to the exterior of the cable will encounter the rigid support members and damage to the cable by such forces will thereby be prevented or at least minimized. Thus, when the cable is attached to an element such as a well pipe by bands or straps, a situation which often causes crushing of a cable, the band engages the outside of jacket 21 and the rigid support members 25 and 26 prevent damage from being done.

Figure 3:
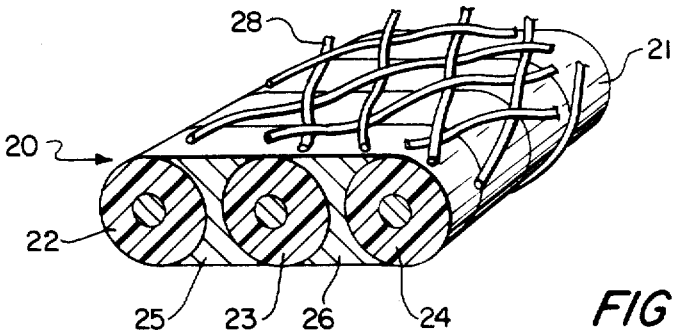
FIG. 3 is a partial perspective sectional view of a cable in accordance with a second embodiment of the invention.

A further embodiment of a cable in accordance with the invention is shown in FIG. 3. The conductors, support members and jacket in the embodiment of FIG. 3 can be the same as in FIG. 2, the additional feature being the provision of a woven sleeve or braid 28 of strands of wire rope, the strands being interwoven to form a tubular mesh structure surrounding the exterior of jacket 21. This sleeve or braid serves to provide additional heat transfer and also to improve the resistance of the cable to mechanical abrasion due to scraping as the cable are installed or removed from the service area. The additional effective surface area for heat transfer comes about because the thermal conductivity of the applied braid, the strands of which are preferably steel, exceeds the thermal conductivity of the ambient environment (oil, water, gas or combinations thereof) and the braid material thus assumes a higher temperature with respect to that environment. This higher temperature allows heat to be transferred to the oil or the like from the braid, as well as from the underlying surface of armor 21. Convection heat transfer is also promoted.

The improved mechanical abrasion resistance is achieved primarily because the strands of the braid run predominantly in a direction along the cable as compared, for example, to the nearly pependicular lap direction of the conventional interlock armor over which the braid is applied. This lengthwise orientation is a very important feature allowing the cable to sustain scrapes and blows to which the cable is subjected as it is slid into and out of oil wells between, for example, an oil pump tube and well casing.

While the cables shown in FIGS. 2 and 3 have three conductors each, it will be apparent that they could contain a different number and the number of support members will preferably be one less than the number of conductors.

Figure 4:
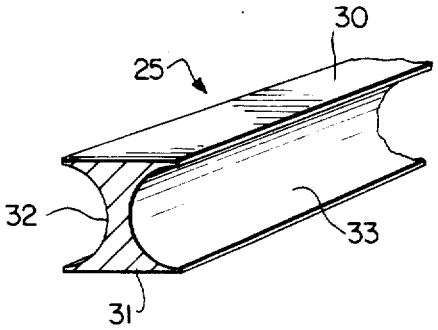
FIG. 4 is a partial perspective sectional view of one embodiment of a support member in accordance with the invention usable in the cables of FIGS. 2 or 3.

FIG. 4 shows one embodiment of a support member, the illustrated member being a small portion of member 25 which is usable in the cable structures of FIGS. 2 and 3. As seen in FIG. 4, the support member is an elongated body having a substantially flat upper surface 30, a substantially flat lower surface 31, and concave side surfaces 32 and 33 which are arcuately concave to generally conform to the shape of the adjacent insulated conductors. As will be recognized, support member 25 is quite rigid and resistive to compression in the direction of compressive forces applied to surfaces 30 and 31, but an elongated member constructed in accordance with FIG. 4 nevertheless has a degree of flexibility and resilience which can permit the cable to undergo long-radius bends as necessary when installing the cable in a service location.

In some circumstances, however, additional flexibility is required. This can be provided by an embodiment such as shown in the side and perspective views of FIGS. 5 and 6. The support member 35 illustrated therein has the same general cross sectional shape as in the embodiment of FIG. 4 with flat upper and lower surfaces 36 and 37, respectively and arcuately concave side surfaces 38 and 39. In addition, this embodiment has means defining a plurality of slots 40 extending inwardly, or downwardly, as illustrated in the figures, from surface 36 and terminating approximately midway through member 35, i.e., approximately in the plane containing the central axes of the conductors. The slots 40 are substantially uniformly spaced apart in the longitudinal direction of the member. Longitudinally spaced between slots 40 are slots 41 which extend upwardly into the body of member 35 from lower surface 37. Slots 41 are also substantially uniformly spaced apart in the longitudinal direction, and be approximately midway between slots 40. Thus, the slots 40, 41 extend inwardly alternately from the upper and lower surfaces, *leaving unitary portions between the slots extending between those surfaces,* and permits greater flexibility in a cable in which they are installed. When installed in a cable, the resulting structure would be similar in appearance to FIGS. 2 and 3, the slots being contained within jacket 21.

Figure 7:
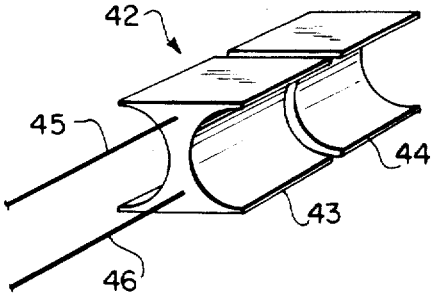
FIG. 7 is a partial perspective sectional view of a third embodiment of a support member in accordance with the invention.

Yet another embodiment of a support member usable in a structure similar to FIGS. 2 and 3 is shown in FIG. 7, the support member 42 illustrated therein being formed from a plurality of identical elongated bodies 43, 44 in end-to-end relationship, each of these bodies having substantially flat upper and lower surfaces which, in the assembled cable, would lie adjacent the inner surfaces of jacket 21, and arcuate side surfaces to conform to the adjacent insulated conductors. Thus, each body is formed so as to be similar to a short section of body 25 described in connection with FIG. 4, but the members are relatively movable to permit additional flexibility of the assembled cable.

In order to maintain these bodies in aligned relationship, particularly during assembly, but also in use, the support member can also include elongated wire or rod-like members 45, 46 extending through opening provided for this purpose in bodies 43, 44 and successive bodies. The members 45, 46 can be solid or twisted strands of wire, for example of sufficient flexibility to not inhibit the flexibility of the overall cable, but of sufficient strength to maintain the bodies 43, 44 in proper relationship.

Figure 8:
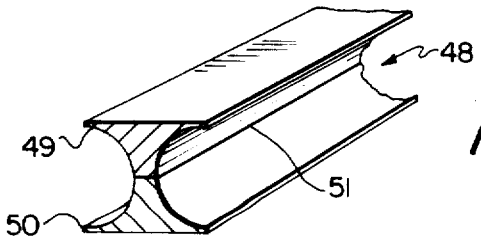
FIG. 8 is a partial perspective sectional view of a fourth embodiment of a support member in accordance with the invention.

A further embodiment of a support member 48 is shown in FIG. 8, the cross sectional shape of the support member being similar to that in FIGS. 4–7. In the embodiment of FIG. 8, the support member is formed of separate upper and lower bodies 49 and 50, each of these bodies being formed as half of a member such as that shown in FIG. 1, the two bodies abutting along a plane 51 which is parallel to, and can be the same as, the plane containing the central axes of the conductors. The advantage of the embodiment of FIG. 8 is that the upper and lower bodies 49, 50 can slide relative to each other at the plane of abuttment location 51, thereby decreasing the resistance to bending of the overall cable. However, in this embodiment, as in the previously described embodiments, this increased flexibility is achieved without sacrificing the thermal conductivity characteristics of the support member or the mechanical support characteristics thereof.

Figure 5:
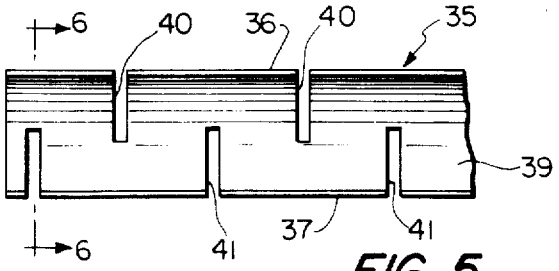
FIG. 5 is a partial side elevation of a second embodiment of a support member usable in the cables of FIGS. 2 and 3.
Figure 6:
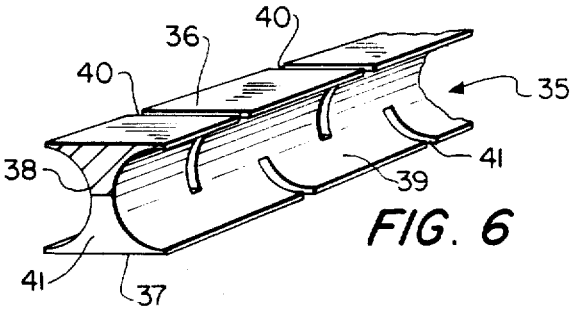
FIG. 6 is a partial perspective sectional view of the member of FIG. 5 along line 6—6.

As will be recognized by those skilled in the art, the bodies can be formed by extrusion, molding or other processes, followed by cutting to form the slots in the embodiment of FIGS. 5 and 6, especially if the members are extruded.

Figure 9:
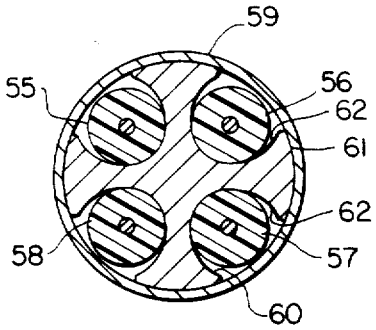
FIG. 9 is a transverse sectional view of a different form of cable showing a fifth embodiment of a support member in accordance with the invention.

The basic principles involved in the present invention can be employed to produce a support member for a cable which has a generally circular cross section rather than the flat cross section discussed in connection with FIGS. 2–8. An example of this is shown in FIG. 9 in which four insulated conductors 55, 56, 57 and 58 are generally circularly arranged within an exterior jacket 59, the conductors being held in position and protected by a support member 60. Jacket 69 can be interlocking armor as described in connection with the flat cable. Support member 60 includes a central portion which extends in parallel relationship with conductors 55–58 and radially outwardly extending legs, equal in number to the number of insulated conductors, each leg being elongated and having an outer surface 61 which is arcuately shaped to engage the inner surface of jacket 59, and an elongated arcuate recess 62 on each side thereof to generally conform to, and receive, one of the insulted conductors. As will be recognized, with an even number of legs, two oppositely extending legs are aligned along a diameter of the generally tubular exterior jacket and thereby quite effectively withstand forces which would tend to crush the cable. As will also be recognized, each recess formed by arcuate surfaces 62 can contain more than one insulated conductor, depending upon the relative sizes of the overall cable and of the insulated conductors to be used in a specific application.

This is also true of the flat cables illustrated in FIGS. 2 and 3 in which one or more of insulated conductors 22, 23 and 24 can, if desired, be a cable in itself, containing multiple conductors, particularly in circumstances where the conductors are to used for the transmission of information signals rather than power.

It will further be recognized that the conductors 22–24 need not be the same size. Thus, in a three-conductor cable conductor 23 could be of a larger exterior diameter than 22 or 24, in which case the cross sectional shape of the overall cable assembly would be generally oval. In this case, the upper and lower surfaces 30 and 31 of the embodiment of the support member shown in FIG. 4 can be slightly curved and sloping to conform to the different sizes of conductors, arcuate recess 32, for example having a larger radius than surface 33 on one of the members, and the reverse being true for the other member.

While certain advantageous embodiments have been chosen to illustrate the invention it will be understood by those skilled in the art that various changes and modifications can be made therein without departing from the scope of the invention as defined in the appended claims.

What is claimed is:

1. An improved electrical cable comprising:

a plurality of elongated, insulated electrical conductors in substantially parallel relationship *and having substantially the same height*, a jacket surrounding [both] *all* of said conductors to at least partially form a cable, said jacket having opposite inner surfaces; and at least one elongated support member within said jacket and between and substantially parallel to adjacent ones of said conductors, said support member being shaped to conform substantially to the exterior shape of the insulation on an adjacent one of said conductors and *having a unitary portion* extending across the interior of said jacket substantially from one inner surface thereof substantially to an opposite inner surface thereof *and having a height substantially equal to the height of said insulated electrical conductors*, and said *unitary portion of said* support member being less compressible across the interior of the jacket than said insulation and having good heat conducting properties, said *unitary portion of said* support member being rigid in cross section for resisting transverse compressive forces but flexible to allow long radius being transverse to the longitudinal axis thereof.

2. A cable according to claim 1 wherein said at least one support member is made of metal.

3. A cable according to claim 2 wherein said at least one support member is made of steel.

4. [A cable according to claim 1 wherein] *An improved electrical cable comprising:*

*a plurality of elongated, insulated electrical conductors in substantially parallel relationship,*

*a jacket surrounding all of said conductors to at least partially form a cable, said jacket having opposite inner surfaces; and*

*at least one elongated support member within said jacket and between and substantially parallel to adjacent ones of said conductors,*

*said support member being shaped to conform substantially to the exterior shape of the insulation on an adjacent one of said conductors and extending across the interior of said jacket substantially from one inner surface thereof substantially to an opposite inner surface thereof, and*

*said support member being less compressible across the interior of the jacket than said insulation and having good heat conducting properties,*

*said support member being rigid in cross section for resisting transverse compressive forces but flexible to allow long radius bending transverse to the longitudinal axis thereof,* said conductors [are] *being* in side-by-side relationship with the central axes thereof lying in substantially the same plane, thereby forming a cable having two generally flat opposite sides.

5. A cable according to claim 4 wherein said at least one support member is a substantially continuous, elongated body having substantially flat upper and lower surfaces adjacent said opposite inner surfaces of said jacket and arcuate concave side surfaces adjacent the exterior surfaces of said insulation.

6. A cable according to claim 5 wherein said at least one support member includes means defining a plurality of longitudinally spaced slots extending inwardly alternately from said upper and lower surfaces and terminating close to the plane containing the central axes of said conductors.

7. A cable according to claim 6 and further comprising an external braid of metal strands surrounding said jacket.

8. A cable according to claim 7 wherein the number of insulated conductors is greater than two and the number of support members is one less than the number of conductors.

9. A cable according to claim 4 wherein each said at least one support member includes a plurality of identical elongated bodies in end-to-end relationship, each said body having substantially flat upper and lower surfaces adjacent said opposite inner surface of said jacket and arcuate concave side surfaces adjacent the exterior surfaces of said conductors.

10. A cable according to claim 9 wherein each said at least one support member further includes first and second elongated strands extending longitudinally through and joining said plurality of bodies.

11. A cable according to claim 10 and further comprising an external braid of metal strands surrounding said jacket.

12. A cable according to claim 11 wherein the number of insulated conductors is greater than two and the number of support members is one less than the number of conductors.

13. A cable according to claim 4 wherein each said at least one support member comprises first and second elongated, parallel, substantially continuous bodies abutting along a plane parallel with the plane containing the central axes of said conductors.

14. A cable according to claim 13 and further comprising an external braid of metal strands surrounding said jacket.

15. A cable according to claim 4 and further comprising an external braid of metal strands surrounding said jacket.

16. A cable according to claim 1 and further comprising an external braid of metal strands surrounding said jacket.

[17. A cable according to claim 1 wherein said conductors are in a generally circular arrangement within a generally tubular jacket, and which includes a single support member having a central portion extending along the central axis of the circle containing said conductors, and a plurality of legs extending radially outwardly from said central portion to said opposite inner surfaces of said jacket and between said conductors, the sides of said legs adjacent said conductors being concave.]

[18. A cable according to claim 17 wherein the number of legs is an even number and wherein the radii along which said legs extend are separated by equal angles.]

[19. A cable according to claim 18 and further comprising an external braid of metal strands surrounding said jacket.]

20. An improved electrical cable comprising:

a plurality of electrical conductor portions having substantially parallel, laterally spaced apart axes;

electrical insulating material covering each of said conductor portions for electrically insulating said conductor portions;

at least one elongated member extending substantially parallel to an adjacent one of said conductor portions, said member being composed of material of relatively good thermal conductivity;

said member having a cross section which diverges [axially] *radially* outwardly from the central axis of the cable such that a surface portion of said one member envelopes approximately one-half of the peripheral surface of said adjacent conductor portion and is spaced therefrom by said insulating material;

said member [being] *having a unitary portion which is* essentially incompressible in cross section as compared with the compressibility of the insulating material, said *unitary portion of said* member being rigid in cross section for resisting transverse compressive forces but flexible to allow long radius bending transverse to the longitudinal axis thereof, *said member having a height substantially equal to the height of the larger of said covered conductor portions.*

21. An improved electrical cable comprising:

a plurality of elongated, insulated electrical conductors in subtantially parallel relationship[:]*;* an exterior jacket surrounding said conductors to form a cable; and at least one elongated, *unitary* support member within said jacket [and between] and parallel [with] *to an* adjacent [ones] *one* of said conductors, said at least one support member extending across the interior of said jacket from one side thereof to the other, said at least one support member having [good heat conducting properties] *a plurality of transverse slots therein*, and said at least one support member being rigid in cross section for resisting transverse compressive forces and being sufficiently flexible to permit bending of the cable along long radius bends.

22. An improved electrical cable [structures] *structure* comprising:

at least two elongated individually insulated electrical conductors of substantially circular cross section having substantially parallel longitudinal axes;

one of said insulated conductors *being* spaced from the other of said conductors so that mutually facing insulation on each of said conductors are spaced apart laterally in a region of closest proximity therebetween;

a force-resisting member in said region laterally opposite at least one of the conductors, the lateral dimension of the cross section of said member in said region being less than the cross sectional dimension of said member which is perpendicular thereto, the latter dimension being substantially equal to the diameter of the insulation on said one conductor, said member being rigid in said cross section for resisting compressive forces applied to said member but flexible to allow long radius bending transverse to the longitudinal axis thereof and having good thermal conducting properties for transferring heat from the cable; and means for enclosing said member and said conductors.

23. The structure according to claim 22 wherein said surface of said force-resisting member adjacent said one conductor is of arcuate shape for substantially conforming to an arcuate peripheral shape of said conductor.

24. The structure according to claim 23 wherein opposite longitudinal surfaces of said force-resisting member are of arcuate shape for substantially conforming to the arcuate shapes of both of said conductors.

25. The structure according to claim 24 wherein said cross section of said force-resisting member is of substantially hourglass shape.

26. The structure according to claim 22 wherein said force-resisting member comprises a multiplicity of longitudinally interconnected elements.

27. The structure according to claim 26, wherein said elements are metallic.

28. The structure according to claim 22 wherein the structure has a flat cross sectional shape.

29. The structure according to claim 22 wherein said means for enclosing comprises a jacket surrounding said conductors having interior and exterior surfaces and wherein said force-resisting member extends adjacent the opposite interior surfaces of said jacket.

30. In an electrical cable of elongated cross section having opposite, flattened sides, wherein there is at least one electrical conductor having electrical insulation thereon within the *and extending substantially fully across* cable, the improvement comprising:

an elongated, force-resisting member within the cable adjacent the insulation on the conductor *and having a height substantially equal to the height of the insulated conductor*, said member comprising two opposite, *substantially flat* edges each of which [being opposite] *is adjacent* a different one of the cable sides, said member having a cross section joining said edges, said cross section being rigid for resisting transverse compressive forces and extending across the interior of the cable substantially from one side thereof to the other, said member *being* composed of a material having a good thermal conductivity for transferring heat from the cable and being flexible to allow long radius bending transverse to the longitudinal axis thereof.

31. [In the] *The* cable according to claim 30 wherein said member is of unitary construction.

32. [In the] *The* cable according to claim 31 wherein said member includes portions of reduced cross section extending inwardly alternately from said edges for imparting bidirectional, long-radius bending capability thereto.

33. A substantially flat electrical cable comprising:

a pair of insulated conductors in spaced side by side relationship, each having an outer diameter D, a force-resisting support member extending completely between and separating said pair of insulated conductors and in contact with each, and means enclosing and contacting said pair of insulated conductors and support members, said support member having a thickness substantially equal to said outer diameter D and a width less than its thickness, said support member having good heat conducting properties, said support member being rigid in cross section for resisting transverse compressive forces but flexible to allow long radius bending transverse to the longitudinal axis thereof.

34. A substantially flat electrical cable comprising:

a pair of insulated conductors in spaced side by side relationship, each having an outer diameter D, a force-resisting support member extending completely between and separating said pair of insulated conductors and adjacent to each, and means enclosing said pair of insulated conductors and support member, said support member having a thickness substantially equal to said outer diameter D and a width less than its thickness, said support member being rigid in cross section for resisting transverse compressive forces but flexible to allow long radius bending transverse to the longitudinal axis thereof.

35. An electrical cable according to claim 34, wherein said support member is formed of a material having a thermal conductivity that is greater than the thermal conductivity of the conductor insulation.

36. An electrical cable according to claim 34, wherein there are two of said support members having substantially the same cross-sectional shape and located adjacent opposite sides of one of said insulated conductors.

37. An electrical cable structure having respective opposite sides and opposite edges, comprising:

a plurality of elongated, individually insulated electrical conductors in substantially parallel relationship, each of said conductors located inwardly adjacent a different one of the two edges;

a pair of discrete, elongated members;

each of said members having longitudinal portions thereof extending parallel to and substantially in contact with the insulation on an adjacent one of said conductors, the member portions mounted substantially perpendicular to the sides of the structure and extending between the sides thereof coextensively with the adjacent insulation on a conductor; and a sheath encasing the insulated conductors and said members, whereby the cable structure has a substantially flattened cross sectional shape characterized by two substantially parallel sides and edges, said elongated members being rigid in cross section for resisting transverse compressive forces but flexible to allow long radius bending transverse to the longitudinal axes thereof.

38. An electrical cable comprising:

a pair of elongated, bendable electrical conductors, each comprising a conductor surrounded by a layer of insulation;

first means, located adjacent the insulation on at least one of said electrical conductors and extending substantially across the cross sectional height of the cable, for providing cross sectional rigidity to the cable for resisting compressive forces exerted in a direction transverse to the longitudinal axes of said electrical conductors, while allowing long radius bending transverse to the longitudinal axes of said electrical conductors; and second means for enclosing said electrical conductors and said first means, said first means having a height substantially equal to the diameter of the insulation on one of said conductors.

*39. In an electrical cable of elongated cross section having opposite, flattened sides, wherein there is at least one electrical conductor having electrical insulation thereon within the cable, the improvement comprising:*

*an elongated, force-resisting member within the cable adjacent the insulation on the conductor, said member comprising two opposite edges each of which is adjacent a different one of the cable sides, said member having a cross section joining said edges, said cross section being rigid for resisting transverse compressive forces and extending across the interior of the cable, said member being flexible to allow long radius bending transverse to the longitudinal axis thereof,*

*said force-resisting member comprising first and second elongated, parallel bodies which abut one another along an interface including a pair of planar surfaces.*

*40. An electrical cable comprising:*

*a pair of elongated, bendable electrical conductors, each comprising a conductor surrounded by a layer of insulation;*

*first means, located adjacent the insulation on both of said electrical conductors and extending substantially across the cross sectional height of the cable, for providing cross sectional rigidity to the cable for resisting compressive forces exerted in a direction transverse to the longitudinal axes of said electrical conductors, while allowing long radius bending transverse to the longitudinal axes of said electrical conductors; and*

*second means for enclosing said electrical conductors and said first means,*

*said first means having a height substantially equal to the diameter of the insulation on at least one of said conductors, and having a substantially I-shaped transverse cross section.*

*41. An improved electrical cable comprising:*

*a plurality of elongated, insulated electrical conductors in substantially parallel relationship;*

*an exterior jacket surrounding said conductors to form a cable; and*

*first and second elongated, support members within said jacket and between and parallel with adjacent ones of said conductors,*

*each of said support members having a flat edge surface lying in a plane which is substantially parallel with planes containing the central axes of said conductors and substantially abutting the flat edge surface of the other member, the flat edge surfaces of said members together extending in substantially abutting relationship across the interior of said jacket substantially from one side thereof to the other, and*

*said members being rigid in cross section for resisting transverse compressive forces and being sufficiently flexible to permit bending of the cable along long radius bends.*

*42. An electrical cable structure having respective opposite sides and opposite edges, comprising:*

*a plurality of elongated, individually insulated electrical conductors in substantially parallel relationship, each of said conductors located inwardly adjacent a different one of the two edges;*

*a pair of discrete, elongated members;*

*each of said members having longitudinal portions thereof extending parallel to and laterally adjacent the insulation on one of said conductors, the member portions mounted substantially perpendicular to the sides of the structure and extending between the sides thereof substantially coextensively with the adjacent insulation on a conductor; and*

*a sheath encasing the insulated conductors and said members, whereby the cable structure has a substantially flattened cross sectional shape characterized by two substantially parallel sides and edges,*

*said elongated members being rigid in cross section for resisting transverse compressive forces but flexible to allow long radius bending transverse to the longitudinal axes thereof.*

*43. An electrical cable structure having respective opposite sides and opposite edges, comprising:*

*a plurality of elongated electrical conductors in substantially parallel relationship, each of said conductors located inwardly adjacent a different one of the two edges and having a covering;*

*a pair of discrete, elongated members;*

*each of said members having longitudinal portions thereof extending parallel to and laterally adjacent the covering on one of said conductors, the member portions mounted substantially perpendicular to the sides of the structure and extending between the sides thereof substantially coextensively with the adjacent covering on a conductor; and*

*a sheath encasing the conductors, the coverings and said members, whereby the cable structure has a substantially flattened cross sectional shape characterized by two substantially parallel sides and edges,*

*said elongated members being rigid in cross section for resisting transverse compressive forces but flexible to allow long radius bending transverse to the longitudinal axes thereof.*

* * * * *